Patented May 3, 1938

2,116,066

UNITED STATES PATENT OFFICE 2,116,066

COATED MATERIALS AND TO PROCESSES FOR PRODUCING THE COATING

John L. Elliot, Dallas, Tex., assignor to The International Printing Ink Corporation, New York, N. Y., a corporation of Ohio No Drawing. Application April 18, 1935, Serial No. 17,057. Renewed September 14, 1937

11 Claims. (Cl. 91—68)

This invention relates to coated materials and to processes and organic compositions for producing the coating, and is herein described in some detail as applied to paper.

Various methods of coating paper and other materials are in use for different purposes, but apparently no coatings available at commercial prices are both water-proof and grease-proof when creased, nor are coatings commercially available which give satisfactory sheens to printed paper and otherwise embellish it by enhancing the color and detail of what is printed on the paper. Moreover, most coated papers crack more easily than the base paper out of which they are made and break more easily than the base paper.

Still fewer coated papers are found to be moisture-proof when subjected to the standard laboratory tests. Besides this, many coatings are expensive and practically all deteriorate rapidly or cause the base papers which carry them to deteriorate.

What is said above applies in more or less degree to coatings on cotton and silk cloth, and on leather. According to the present invention the foregoing and other difficulties are overcome, and a paper or other surface is produced having greatly increased strength, and greater resistance to damage by creasing or folding, being absolutely water-proof and grease-proof, if desired. Moreover the coating may be so applied to paper as to enhance the richness of color, to produce a hitherto unattainable sheen, and to develop beauty of detail in color printing carried upon the paper.

The form of the coating found most effective for some purposes has been found to lie principally within the paper, adding too little to its thickness to be easily measured by any ordinary micrometer calipers yet such a coating may fully double the strength of the paper beside rendering it water-tight and grease-proof, and keeping the paper from being soiled. Even ink and pencil marks may be removed without damaging the finish on the paper.

The coating materials of the present invention are non-toxic, at least in any amounts likely to be used, and, as a result, the coated papers are well adapted for wrapping foods and other wet or greasy or perishable articles.

In one form of the invention described in some detail, the coating material is largely composed of rubber, which, with the admixture of some materials of the present invention, even in relatively small proportions is found to penetrate itself uniformly over them, closing the pores of paper, and behaving as though it "wetted" the fibers of the paper in a way hitherto deemed impossible.

Other features and advantages will hereinafter appear.

One of the best grease and moisture-proof coatings even when folded, was prepared so that it included a special synthetic resinous material which may be called of the "glyptal" type. To prepare this resinous material approximately equivalent reacting molecular proportions of glycerine and the phthalic radical in the form of phthalic acid or phthalic anhydride were used. About twice as much of the acid or anhydride as glycerine was found very satisfactory. The most satisfactory composition was obtained by heating a mixture of the glycerine and anhydride to above 200° C. and allowing it to cook for about twenty minutes between 200° C. and 210° C.

The best results were obtained when the hot mixture contained an addition of about 0.25% of either ammonium hydroxide, ammonium carbonate, zinc carbonate, or sodium hydroxide or carbonate. Apparently these added materials served as more or less alkaline catalysts.

Longer heating produced a harder resinous material which proved useful but not as desirable for many purposes as the short cooked gum. As much as eighteen hours treating has proved useful where very tough materials were desired. Glycerine seems most useful, though apparently, other polybasic alcohols may be substituted for it, such as the simpler glycols.

The special resinous material prepared as above was soluble in many organic solvents, but, considering price, the two most generally useful ones were alcohol and ethylene dichloride.

For making paper grease-proof and water-proof a solution of the resinous material was mixed with a solution of rubber in the same solvent, and the mixed solutions applied to the paper base, often two pounds of solids to the gallon of solution.

Certain precautions were advisable in preparing the mixed solution. It was found best to pour the solution of resinous material into the solution of rubber a little at a time and thoroughly mix in each added portion until a clear solution was obtained before adding another portion. The best results were obtained in mixing with rubber when the rubber was dissolved in a suitable petroleum spirit, ethylene dichloride or benzole.

The most satisfactory rubber was found to be pale crepe rubber which had been treated to "destroy its fiber", as by milling it four to six hours.

Useful results for some purposes with some of the resinous materials mentioned below were also obtained when the chlorinated rubber compound known as "duprene" or when a commercial rubber cement was substituted for the rubber, with appropriate solvents.

It was found that satisfactory results could be obtained by using a dispersion of the gum in water mixed with a dispersion of rubber in water, such as natural latex. Artificial dispersions of rubber in water were successfully used when such a dispersion was emulsified in presence of ammonium linoleate with a solution of the resinous material in one of the organic solvents.

The liquid carrying the rubber and resinous material was satisfactorily spread on paper by a "doctor bar" giving a thin even coating which dried in less than thirty-five or forty seconds. The coating left on the paper was very tacky although a coating on paper printed in several colors took up only 0.31 gram in 58 square inches. Moreover, despite the very obvious tackiness, the thickness of the paper showed almost no measurable increase when measured with micrometer calipers.

The following three mixtures were found satisfactory:

|  | 1 | 2 | 3 |
|---|---|---|---|
| Special gum or resinous material | 10 | 20 | 15 |
| Rubber (pale crepe) | 90 | 80 | 85 |
| Ethylene dichloride | 400 | 355 | 48 |
| Petroleum spirit or solvent |  |  | 252 |
| Alcohol |  | 45 |  |

Other varieties of rubbers, such as smoked sheet, dried latex and even reclaimed rubber where color was not objectionable, proved useful. A still more satisfactory coating for some purposes was made with resinous material 15%, plasticizer 15%, and rubber 70%.

The above coating compositions, when spread on paper, produced a pliable material, which was decidedly more flexible than the uncoated paper, and from which the coating did not peel, though it was decidedly tacky. Furthermore the paper did not crack when creased sharply.

Upon this coating was spread a second coating to eliminate tackiness and to render the surface grease proof. This second coating usually included a resinous material having the same properties as the resinous material in the rubber (often the same resinous material) but many (apparently almost any) lacquers having the desired flexibility were very satisfactory. The second coating included no rubber but included suitable cellulose derivative carried in a suitable solvent.

The four following mixtures provided suitable solids for the second coating:

|  | 1 | 2 | 3 | 4 |
|---|---|---|---|---|
| Special gum resinous material | 30 | 40 | 20 | 40% |
| Cellulose acetate | 50 | 35 | 55 | 22.5 |
| Cellulose nitrate (½ sec.) | 5 | 10 | 10 | 22.5 |
| Plasticizer (Santicizer M17) | 15 | 15 | 15 | 15.0 |

The plasticizer was methyl-phthalylethyl-glycolate.

It was found that the coated paper showed less tendency to crack or show a "craze" if the rubber coating contained plasticizer, preferably the same plasticizer. Perhaps the rubber drained off the plasticizer from the upper coat when it did not contain plasticizer itself.

Cellulose acetate was of especial value because it had no tendency to curl the coated paper by shrinking. Otherwise the nitrate might be used alone. Nitrate was not essential but seemed to give a somewhat more reliable coating when present to at least several per cent. Other cellulose esters were usable but at a commercially prohibitive cost.

The foregoing solids and plasticizer were satisfactory when dissolved in a wide variety of solvents, such as acetone, ethyl acetate, butyl acetate mixtures and other solvents, usually to carry three pounds solids per gallon. The three following mixtures provide suitable solvents:

|  | 1 | 2 | 3 |
|---|---|---|---|
| Ethylene dichloride | 75 | 70 | 60 |
| Alcohol | 25 | 25 | 25 |
| Ethyl acetate |  | 5 | 15 |

The coatings, both first and second, were satisfactorily applied by a spreading machine or doctor bar or blade. It was also found possible to apply the coatings as sprays.

When the second coating was applied over the first the 58 square inches of paper carried an additional 0.5 gram of solids, or a total of 0.81 gram.

It was found possible to put on one waxing paper a first coat of 0.00075 inch and a second coat of 0.00075, producing a film, apparently penetrating within the sheet to the extent of 25%, and sometimes the two coatings combined to give a total thickness of 0.00065 inch. The undercoat of one coated paper stretched considerably without breaking even when the paper was cautiously torn until the fibers were pulled apart and the top coating had given away.

A paper coated with the resin compound containing spray dried latex rubber or with the latex emulsion described above was found to give the paper more tensile strength than the same paper uncoated.

The double coated papers, made as above, were found to be fully fifty percent stronger than the uncoated paper besides being grease-proof and water-proof.

It was found, for example, that cheese was successfully pasteurized when wrapped in an ordinary cheese label paper which had been coated as above described, the paper showing neither grease nor moisture leakage after pasteurizing for the usual time. It was also found that one paper thus coated could be abraded off the back by moistening a finger and cautiously rubbing until it left a perfectly clear transparent film free from paper fibers.

It was found possible to coat other organic fibrous base material such as fine silk fabrics, including crepe and plain woven silk, by the same double coat process. The product made of white silk was cream-colored, instead of white, and was somewhat stiffened, but was fully water-proof and grease-proof.

A heavily sized cotton cloth, roller shade cloth, was also successfully coated by the same double coat process, yielding a flexible non-cracking water-proof and grease-proof fabric. It was successfully washed without injury, with soap and water.

It has been found that in some instances several weeks exposure to the weather and bright sun is without adverse effect on coated paper made by this process.

The two coatings, as intimated above, were successfully applied to a paper label printed in several colors, and the coatings, instead of causing the printer's ink to spread, were found to enhance the brilliancy of the colored inks, to develop detail, and to embellish the label with a hitherto unattainable sheen.

The presence of plasticizer, in the formulas given above is of some advantage, but is not always essential. Moreover, the cellulose ester need not be pure. Esters reclaimed from scrap and carrying, apparently, other plasticizers, were found useful.

The foregoing description is based on a phthalic glyceride, because that is commercially useful and the most economical material so far tested.

Even better results were obtained by substituting the product which was obtained by heating for five hours under a reflux condenser at 100° C. fifty grams acetaldehyde, one gram sodium hydroxide and five c. c. of water.

Another substitute material which was found to eliminate all tendency to hygroscopicity was obtained by heating for 25 minutes to 210° C. one part phthalic anhydride, one part citric acid, and one part glycerol.

Another paper which was proved by elaborate tests to be even more grease-proof and more water-proof was made by dissolving 67½ parts of rubber in ethylene dichloride, separately dissolving 20 parts of a pale "vinylite" resin of Carbide and Carbon Chem. Corp. in ethylene dichloride, agitated and during agitation added 12½ parts of dibutyl phthalate as plasticizer, and added 3/100 of a gram of #32 oil blue of Greigy Chemical Co. per gallon of the mixture.

This was put on paper (either clay coated or uncoated were equally good) with a doctor bar, and dried for 40 seconds at 30° to 40° C. (15 seconds at 140° F. gave the same result) though drying later proved unnecessary.

A second coating was applied, as follows: Forty parts of the same vinylite resin were dissolved in a solvent made of 70% ethylene dichloride, denatured alcohol 25%, acetone 5%, and then there were added to the same solvent 22½ parts of cellulose acetate, 22½ parts of cellulose nitrate and 15 parts of dibutyl phthalate.

The second coat dried at the same rate as the first. It was flexible, did not crack or craze, did not affect inks, and applied to a blue water-tinted paper produced a richness of color hitherto unattained.

Another lot of paper was coated with a first coat with rubber (like the last) 67½ parts, resinous material 20 parts, and plasticizer M17 of monsanto 12½ parts,—the resinous material being made by heating together 57 parts of santicizer #9, and said to be paratoluenesulphonamid, 42 parts of 40% solution of formaldehyde, and 1 part of ammonium carbonate.

The foregoing were dissolved in ethylene dichloride as before, rubber and resinous material in separate portions. A top coating was applied over this precisely like the "vinylite" coating, above described, except that the new "santicizer" resinous material was substituted for the "vinylite" resinous material.

The coated paper thus obtained under the severest tests possible proved more moisture proof than the phthalic glyceride coating, but slightly less grease-proof.

A slightly cheaper coating was made by dissolving 80 parts of rubber and 20 parts of ester gum separately in benzole, and mixing and applying by a doctor bar and dried.

A second coating was applied of the phthalate-containing lacquer above described. The white calendered clay-free paper had about as good a gloss, good adhesion, was flexible, turned only slightly brown after a month's exposure to sunlight in laboratory air, was as waterproof as the phthalate containing resinous material and almost as grease-proof.

Plasticizer in the first coat is sometimes advantageous.

When manila ester gum was substituted for the ester gum a slightly more grease-proof paper was obtained.

Rubber, 80 parts, dissolved in Standard Oil Co. solvent No. 63, mixed with pontianac gum 20 parts, dissolved in denatured ethyl alcohol, gave a useful undercoat which coated with the phthalic glyceride lacquer, though a slightly streaky finish.

Gutta percha resin (obtained in the refining of gutta percha) and rubber dissolved separately in the solvent No. 63 and mixed gave a non-streaky, good finish to the top coat. The same gum and rubber give similar results dissolved in benzole or in ethylene dichloride.

Elmi gum, in the same proportions, with rubber, dissolved in alcohol, or benzole or ethylene dichloride gave a good gloss with an orange peel effect.

Balata gum provided a satisfactory resinous material where color was not important.

Resins seem to increase the adhesion of the coatings to the paper. Rubber enhances the gloss of the top coat and keeps inks from running. Some red or blue inks that seemed to run sometimes, did not run when drying was done at 40° to 50° C.

Acetyl cellulose sweepings were satisfactory where color was not important. And some colored acetyl cellulose or film scrap was useful when cleaned by centrifuging. Any variation in acidity was unimportant except when the acid present attacked the doctor bar or other apparatus.

When alcohol solvents caused the rubber solution to become cloudy, usually ethylene dichloride was a satisfactory substitute.

It has been found that useful coatings have been obtained when a layer of some of the spirit varnishes was superposed upon a base, such as paper, coated with rubber carrying one of the resinous materials.

Having thus described certain embodiments of the invention, what is claimed is:

1. A coated material including a cellulosic base material, a coating of rubber carrying a smaller proportion of resinous material compatible therewith, a plasticizer in the coating, a cover coating including a cellulose ester, a resinous material in the cover coating compatible with the rubber, and more of the plasticizer in the cover coating.

2. A paper carrying a coating consisting largely of rubber and containing a less quantity of a resinous material miscible with the rubber and adapted to cause the rubber to wet the paper, and a further coating consisting largely of cellulose acetate and carrying a further quantity of the resinous material.

3. The process of coating an organic base sheet to produce a resistant, stable, flexible coating which consists in applying to it a solution of rubber in a solvent including a chlorine-containing compound and alcohol carrying a resinous material adapted to cause the rubber to wet this sheet, and then applying a solution of a cellulose ester including a softener to cover the first coating while still tacky.

4. The process of coating a material which consists in applying a coating including rubber and a lesser quantity of a resinous material compatible therewith and also including a plasticizer, drying at least partially the coating, and thereafter applying a coating including cellulose ester, a resinous material compatible with rubber, and further plasticizer.

5. The process of coating a material which consists in applying a coating solution including rubber in a solvent including a chlorine-containing compound and alcohol and a lesser quantity of a resinous material compatible therewith and also including a plasticizer, and thereafter applying a coating solution in a solvent compatible with the rubber, and including cellulose ester.

6. The process of coating a material which consists in applying a coating solution including rubber and a resinous material compatible therewith carried in an organic solvent, and thereafter applying while the first coating is still tacky a coating including a solvent for rubber and carrying a cellulose ester and a resinous material compatible with rubber.

7. The process of coating a material which consists in applying a coating solution including rubber and a resinous material compatible therewith carried in an organic solvent, and also including a plasticizer, and thereafter applying a coating including a solvent for rubber and carrying a cellulose ester and a resinous material compatible with rubber, and also including plasticizer.

8. The process of coating a material which consists in applying a coating solution including rubber and a resinous material compatible therewith carried in an organic solvent, and also including a plasticizer, and thereafter applying a coating including a solvent for rubber and carrying a cellulose ester and a resinous material compatible with rubber, and also including the same plasticizer.

9. The process of coating a material which consists in separately dissolving rubber and resinous material in organic solvent containing mainly a chlorine-containing compound and alcohol, mixing the solutions, including also plasticizer, coating the material with the solution, and thereafter applying a flexible lacquer.

10. A coated paper carrying an undercoat including rubber and resin and plasticizer, and carrying a surface coat of cellulose ester and resin and plasticizer, and adapted to permit the paper to be rubbed off leaving the transparent film of the coating.

11. A moisture-proof grease-proof paper carrying an undercoat including rubber and less resin and plasticizer and carrying a surface coat of cellulose ester, part at least being cellulose acetate, a smaller amount of resin than ester, and plasticizer, and adapted to permit the paper to be rubbed off leaving the transparent film of the coating.

JOHN L. ELLIOT.